(12) United States Patent
Jiang et al.

(10) Patent No.: US 11,805,214 B2
(45) Date of Patent: Oct. 31, 2023

(54) IMAGE FORMING APPARATUS, CONTROL SYSTEM, AND CONTROL METHOD USING A DETACHABLE PART

(71) Applicant: Zhuhai Pantum Electronics Co., Ltd., Zhuhai (CN)

(72) Inventors: Baoxu Jiang, Zhuhai (CN); Yu Huang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 17/473,569

(22) Filed: Sep. 13, 2021

(65) Prior Publication Data
US 2022/0086299 A1   Mar. 17, 2022

(30) Foreign Application Priority Data
Sep. 14, 2020   (CN) .......................... 202010961789.2

(51) Int. Cl.
  *H04N 1/00*   (2006.01)
  *G06F 3/12*   (2006.01)
(52) U.S. Cl.
  CPC ....... *H04N 1/00965* (2013.01); *G06F 3/1203* (2013.01); *G06F 3/123* (2013.01); *H04N 1/00938* (2013.01)
(58) Field of Classification Search
  CPC .... G06F 3/1224; G06F 3/1225; G06F 3/1227; G06F 3/123; G06F 3/1292; H04N 1/00938; H04N 1/32776; H04N 2201/0075; H04N 2201/0094
  USPC .................................................. 358/1.15
  See application file for complete search history.

(56) References Cited

U.S. PATENT DOCUMENTS

| | | | |
|---|---|---|---|
| 9,354,898 B1* | 5/2016 | Luttmann | G06F 9/4415 |
| 2003/0048473 A1* | 3/2003 | Rosen | G06F 3/1204 |
| | | | 358/1.15 |
| 2003/0123082 A1* | 7/2003 | Hall | G06F 3/1225 |
| | | | 358/1.15 |
| 2009/0103124 A1* | 4/2009 | Kimura | G06F 3/1292 |
| | | | 358/1.15 |
| 2014/0282490 A1* | 9/2014 | Shinomiya | G06F 8/61 |
| | | | 717/174 |

(Continued)

*Primary Examiner* — Kent Yip
(74) *Attorney, Agent, or Firm* — ANOVA LAW GROUP, LLC

(57) ABSTRACT

An image forming apparatus, and a control system and a control method of the image forming apparatus are provided. The image forming apparatus includes a non-transitory memory, a first controller, and a first interface. The first controller, connected to the non-transitory memory, is configured to control read and write of the non-transitory memory; first and second storage regions are configured in the non-transitory memory; the first storage region is configured to store driving programs; and the second storage region is configured to store first firmware files. The first interface is connected to the first controller; an external device accesses the non-transitory memory through the first interface; the driving programs are acquired by the external device through the first interface and installed in the external device; and the external device is capable of exchanging information with the image forming apparatus through an interface different from the first interface.

20 Claims, 4 Drawing Sheets

(56) References Cited

U.S. PATENT DOCUMENTS

2014/0355048 A1* 12/2014 Kang ................... G06F 3/1292
358/1.15
2015/0082389 A1* 3/2015 Han ..................... H04L 63/205
726/4

* cited by examiner

IMAGE FORMING APPARATUS, CONTROL SYSTEM, AND CONTROL METHOD USING A DETACHABLE PART

CROSS-REFERENCE TO RELATED APPLICATION

This application claims priority to Chinese Patent Application No. 202010961789.2, filed on Sep. 14, 2020, the entire content of which is incorporated herein by reference.

TECHNICAL FIELD

The present disclosure generally relates to the field of image forming technology and, more particularly, relates to an image forming apparatus, and a control system and a control method of the image forming apparatus.

BACKGROUND

In the existing technology, for an image forming apparatus (e.g., a printer), an optical disc may be attached to store the driving program of the printer; and after the printer is delivered, a user may acquire the driving program of the printer by reading the optical disc with an optical disc drive of a computer and install the driving program on the computer. However, current computers may not have the optical disc driving function. Using the optical disc to install the driving program of the printer may be inconvenient to the user and result in that the driving program is not able to be installed. Furthermore, the use of the optical disc may not be beneficial for saving costs.

SUMMARY

Current computers may not have the optical disc driving function; using the optical disc to install the driving program of the printer may be inconvenient to the user and result in that the driving program is not able to be installed; and the use of the optical disc may not be beneficial for saving costs. Therefore, various embodiments of the present disclosure provide an image forming apparatus, and a control system and a control method of the image forming apparatus.

One aspect of the present disclosure provides an image forming apparatus. The image forming apparatus includes a non-transitory memory; a first controller, connected to the non-transitory memory, where the first controller is configured to control read and write of the non-transitory memory; a first storage region and a second storage region are configured in the non-transitory memory; the first storage region is configured to store driving programs; and the second storage region is configured to store first firmware files; and further includes a first interface, connected to the first controller, where an external device accesses the non-transitory memory through the first interface; the driving programs are acquired by the external device through the first interface and installed in the external device; and the external device is capable of exchanging information with the image forming apparatus through an interface different from the first interface.

For the above-mentioned image forming apparatus, the first storage region and the second storage region are configured in the non-transitory memory through the first controller, where the first storage region is configured to store the driving programs, and the second storage region is configured to store the first firmware files. In addition, the first interface that communicates with the first controller and the external device are configured respectively. Furthermore, the external device acquires and installs the driving programs of the first storage region through the first interface. Therefore, it may avoid that the driving programs of the image forming apparatus cannot be installed because the external device does not have an optical drive; the use of the optical disc may be reduced; and the design cost of the image forming apparatus may be reduced.

Optionally, the image forming apparatus further includes a second controller; and a second interface, connected to the first controller, where the second controller reads the first firmware files in the second storage region through the second interface to execute startup and operation of the image forming apparatus.

Optionally, the external device only reads and writes data of the first storage region in the non-transitory memory through the first interface; and the second controller reads and writes data of the first storage region and the second storage region in the non-transitory memory through the second interface.

Optionally, the first controller is further configured to receive second firmware files through the first interface, and store the second firmware files in the first storage region; the second controller is further configured to scan the second firmware files in the first storage region through the second interface to detect whether there is a first firmware file needs to be upgraded; and when there is the first firmware file needs to be upgraded, the second controller is configured to copy the second firmware files to the second storage region to upgrade the first firmware file.

Optionally, the image forming apparatus further includes a data selector, where the data selector is connected to the first controller, the first interface, and the second interface, respectively; the data selector is configured to control conduction between the first controller and the first interface when the external device accesses the non-transitory memory, such that the external device accesses the first storage region through the first interface; and the data selector is further configured to control conduction between the first controller and the second interface when the second controller communicates with the non-transitory memory, such that the second controller accesses the non-transitory memory through the second interface.

Optionally, the non-transitory memory, the first interface, the second interface, the data selector, and the first controller form a detachable part; and the detachable part is pluggably connected to a main body of the image forming apparatus.

Optionally, the first interface and the second interface of the detachable part correspond to different physical interfaces; the main body of the image forming apparatus is configured with a third interface; the detachable part is connected to the third interface of the main body of the image forming apparatus through the second interface; and the detachable part is connected to the external device through the first interface.

Optionally, the first interface and the second interface of the detachable part correspond to a same physical interface; the main body of the image forming apparatus is configured with a third interface; when the same physical interface is connected to the third interface, the second controller communicates with the non-transitory memory in the detachable part through the third interface and the second interface; and when the same physical interface is connected to the external device, the external device only accesses the first storage region of the non-transitory memory through the first interface.

Another aspect of the present disclosure provides a control system. The control system includes an image forming apparatus and an external device, where the image forming apparatus includes a non-transitory memory; a first controller, connected to the non-transitory memory, where the first controller is configured to control read and write of the non-transitory memory; a first storage region and a second storage region are configured in the non-transitory memory; the first storage region is configured to store driving programs; and the second storage region is configured to store first firmware files; and further includes a first interface, connected to the first controller, where the external device accesses the non-transitory memory through the first interface; the driving programs are acquired by the external device through the first interface and installed in the external device; and the external device is capable of exchanging information with the image forming apparatus through an interface different from the first interface.

Optionally, the control system further includes a second controller; and a second interface, connected to the first controller, where the second controller reads the first firmware files in the second storage region through the second interface to execute startup and operation of the image forming apparatus.

Optionally, the external device only reads and writes data of the first storage region in the non-transitory memory through the first interface; and the second controller reads and writes data of the first storage region and the second storage region in the non-transitory memory through the second interface.

Optionally, the first controller is further configured to receive second firmware files through the first interface, and store the second firmware files in the first storage region; the second controller is further configured to scan the second firmware files in the first storage region through the second interface to detect whether there is a first firmware file needs to be upgraded; and when there is the first firmware file needs to be upgraded, the second controller is configured to copy the second firmware files to the second storage region to upgrade the first firmware file.

Optionally, the control system further includes a data selector, where the data selector is connected to the first controller, the first interface, and the second interface, respectively; the data selector is configured to control conduction between the first controller and the first interface when the external device accesses the non-transitory memory, such that the external device accesses the first storage region through the first interface; and the data selector is further configured to control conduction between the first controller and the second interface when the second controller communicates with the non-transitory memory, such that the second controller accesses the non-transitory memory through the second interface.

Optionally, the non-transitory memory, the first interface, the second interface, the data selector, and the first controller form a detachable part; and the detachable part is pluggably connected to a main body of the image forming apparatus.

Optionally, the first interface and the second interface of the detachable part correspond to different physical interfaces; the main body of the image forming apparatus is configured with a third interface; the detachable part is connected to the third interface of the main body of the image forming apparatus through the second interface; and the detachable part is connected to the external device through the first interface.

Optionally, the first interface and the second interface of the detachable part correspond to a same physical interface; the main body of the image forming apparatus is configured with a third interface; when the same physical interface is connected to the third interface, the second controller communicates with the non-transitory memory in the detachable part through the third interface and the second interface; and when the same physical interface is connected to the external device, the external device only accesses the first storage region of the non-transitory memory through the first interface.

Another aspect of the present disclosure provides a control method of an image forming apparatus. The control method includes configuring a first storage region and a second storage region in a non-transitory memory of the image forming apparatus; storing driving programs in the first storage region and storing first firmware files in the second storage region; and communicating with an external device through a first interface, where the driving programs are acquired by the external device through the first interface and installed in the external device; and the external device is capable of exchanging information with the image forming apparatus through an interface different from the first interface.

Optionally, the control method further includes reading the first firmware files through a second interface to execute startup and operation of the image forming apparatus; receiving second firmware files through the first interface, and storing the second firmware files in the first storage region; scanning the second firmware files in the first storage region through the second interface to detect whether there is a first firmware file needs to be upgraded; and when there is the first firmware file needs to be upgraded, copying the second firmware files to the second storage region to upgrade the first firmware file.

Optionally, the external device only reads and writes data of the first storage region in the non-transitory memory through the first interface; and a second controller reads and writes data of the first storage region and the second storage region in the non-transitory memory through a second interface.

Optionally, the control method further includes communicating with the external device through the first interface, where configuration information of a network is acquired by the external device through the first interface; and reading the configuration information through the second interface to execute the image forming apparatus to connect to the network.

Other aspects of the present disclosure can be understood by those skilled in the art in light of the description, the claims, and the drawings of the present disclosure.

For the above-mentioned control system and control method, the first storage region and the second storage region are configured in the non-transitory memory of the image forming apparatus. The first storage region is configured to store the driving programs, and the second storage region is configured to store the first firmware files. The external device acquires the driving programs of the first storage region through the first interface to implement the installation of the driving programs. Therefore, it may avoid that the driving programs of the image forming apparatus cannot be installed because the external device does not have an optical drive; the use of the optical disc may be reduced; and the design cost of the image forming apparatus may be reduced.

DETAILED DESCRIPTION

In order to clearly illustrate the objectives, technical solutions, and advantages of the present disclosure, the following further describes the present disclosure in detail with reference to the accompanying drawings and embodiments. It should be understood that the specific embodiments described herein are merely configured to explain the present disclosure, and are not configured to limit the present disclosure.

In the description of the present disclosure, unless expressly stipulated and limited otherwise, the terms "first" and "second" are merely used for descriptive purposes, and cannot be understood as indicating or implying relative importance; and unless otherwise specified or stated, the term "plurality" refers to two or more. The terms "connection" and "fixation" should be understood in a broad sense. For example, "connection" can be a fixed connection, a detachable connection, or an integral connection, or an electrical connection; and can be a direct connection or an indirect connection through an intermediate medium. For those skilled in the art, the specific meaning of the above-mentioned terms in the present disclosure can be understood according to specific circumstances.

In the description of the present specification, it should be understood that the directional terms such as "above" and "under" described in various embodiments of the present disclosure are described from the angle shown in the accompanying drawings, and should not be understood as a limitation to various embodiments of the present disclosure. Furthermore, in the context, it also should be understood that when it is mentioned that an element is connected "above" or "under" another element, it can not only be directly connected "above" or "under" the other element, but also be indirectly connected "above" or "under" another element through an intermediate element.

Figure 1:
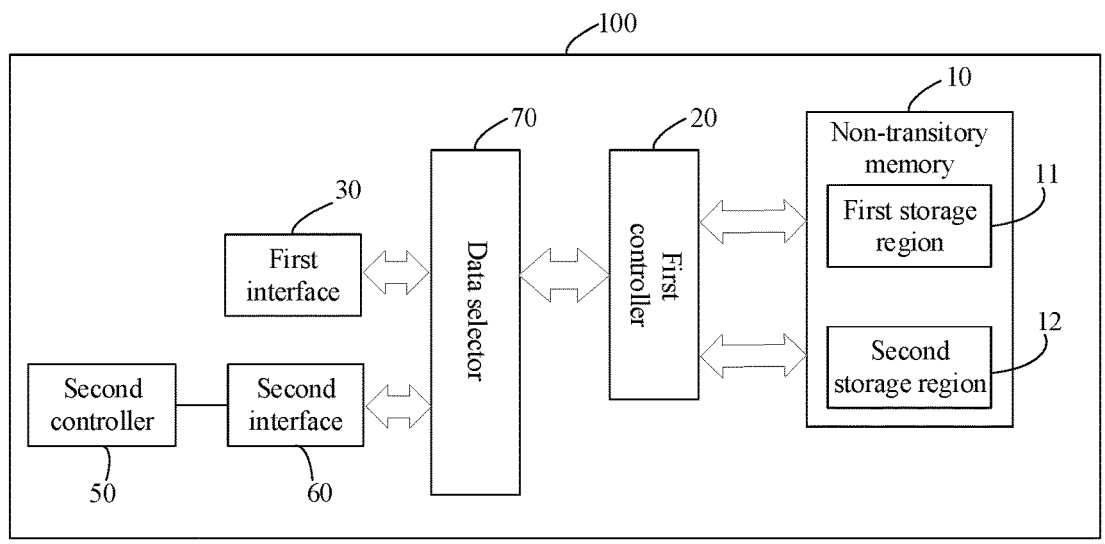
FIG. 1 illustrates a functional block diagram of an image forming apparatus according to various exemplary embodiments of the present disclosure.

Referring to FIG. 1, various embodiments of the present disclosure provide an image forming apparatus 100, including a non-transitory memory 10, a first controller 20, and a first interface 30. The first controller 20 may be connected to the non-transitory memory 10 and configured to control read and write of the non-transitory memory 10. A first storage region 11 and a second storage region 12 may be configured in the non-transitory memory 10. The first storage region 11 may be configured to store driving programs, and the second storage region 12 may be configured to store first firmware files. The first interface 30 may be connected to the first controller 20, and an external device may access the non-transitory memory 10 through the first interface 30. The driving programs may be acquired by the external device through the first interface 30 and installed in the external device, such that the external device may exchange information with the image forming apparatus 100 through an interface different from the first interface 30, i.e., a non-first-interface.

For example, the non-transitory memory may be a Flash memory or an electrically erasable programmable read-only (EEPROM) memory, and may also be a solid state drive (SSD) or a hard disk.

For example, the driving programs stored in the first storage region 11 may be programs that enable the external device to exchange information with the image forming apparatus 100. For example, the driving programs may be print driving programs that enable the external device to send printing tasks, scan driving programs that enable the external device to acquire scanned images, application programs that enable the external device to configure the network connection of the image forming apparatus 100, application programs that enable the external device to edit scanned images, and installation wizard programs that enable the external device to install print driving programs or scan driving programs. The information that the external device exchanges with the image forming apparatus 100 through the interface different from the first interface may, for example, include, but may not be limited to: printing data, printing instructions, scanning instructions, scanning data, and network configuration information (e.g., service set identifier (SSID) and password). The interface different from the first interface may be an interface between the image forming apparatus 100 and the external device for exchanging image forming operations (e.g., printing jobs and scanning images), or an interface when the external device configures the network of the image forming apparatus 100, including a commonly used USB interface, a wired network interface, a WiFi interface, a Bluetooth interface, an infrared interface, a near-field communication (NFC) interface, and the like.

The components or parts of the image forming apparatus may be improved in various embodiments of the present disclosure. In addition to keeping the common communication interface configured to connect the image forming apparatus with the external device in the existing technology, the first storage region may be configured in the internal non-transitory memory for storing the driving programs, and the first interface may be constructed. Therefore, the external device may acquire the driving programs through the first interface, which reduces the use of the optical disc and is greatly convenient for the user to perform the installation operation of the driving programs.

In the image forming apparatus 100 of various embodiments of the present disclosure, the first storage region 11 and the second storage region 12 may be configured in the non-transitory memory 10 through the first controller 20, where the first storage region 11 may be configured to store the driving programs, and the second storage region 12 may be configured to store the first firmware files. In addition, the first interface 30 which communicates with the first controller 20 and the external device respectively may be configured. Furthermore, the external device may acquire and install the driving programs of the first storage region 11 through the first interface 30. Therefore, it may avoid that the driving programs of the image forming apparatus 100 cannot be installed because the external device does not have an optical drive, the use of the optical disc may be reduced, and the design cost of the image forming apparatus may be reduced.

For example, the first controller 20 may be a Flash controller, the non-transitory memory 10 may be separately partitioned in hardware through the Flash controller. In such way, the first storage region 11 configured in the non-transitory memory 10 inside the image forming apparatus may be accessed by the external device. It is equivalent to using the first storage region 11 of the non-transitory memory 10 as a U disk, which is convenient for the user to install the driving programs, thereby eliminating the optical disk in the existing technology.

In one embodiment, the image forming apparatus 100 may further include a second controller 50 and a second interface 60. The second interface 60 may be connected to the first controller 20. The second controller 50 may read the first firmware files in the second storage region 12 through the second interface 60. After the first firmware files are loaded, the startup and operation of the image forming apparatus 100 may be performed. The physical space of the first storage region 11 may be equivalent to a U disk. The first firmware files may be the existing firmware of the image forming apparatus 100, that is, the factory firmware of the image forming apparatus 100; and the first firmware files may also be called control programs. The second controller 50 may be the main control center of the image forming apparatus 100 for controlling various components of the image forming apparatus 100, whereby collectively implementing the image forming function of the image forming apparatus 100. The second firmware files may be new firmware files provided by the external device, and the new firmware files may upgrade the existing firmware.

The non-transitory memory 10 may configure partitions in a manner that the external device can only read and write data in the first storage region 11 in the non-transitory memory 10 through the first interface 3, and the second controller 50 can read and write data in the first storage region 11 and the second storage region 12 in the non-transitory memory 10 through the second interface 60.

By configuring partitions as described above to control the external device to only read and write the first storage region 11, the data in the second storage region 12 in the non-transitory memory 10 may be protected from being leaked or read/written, and when installing the driving programs, it ensures that other data of the image forming apparatus may be maintained confidential from being modified.

In one embodiment, the first controller 20 may further be configured to receive the second firmware files through the first interface 30, and store the second firmware files in the first storage region 11. The second controller 50 may further be configured to scan the second firmware files in the first storage region 11 through the second interface 60 to detect whether there is a first firmware file needs to be upgraded. When there is the first firmware file needs to be upgraded, the second controller 50 may be configured to copy the second firmware files to the second storage region 12 to upgrade the first firmware file.

In one embodiment, the first controller 20 may store the second firmware files in the first storage region 11 through the first interface 30, and the second controller 50 may scan the second firmware files in the first storage region 11 through the second interface 60 to detect whether there is a first firmware file needs to be upgraded. When there is the first firmware file needs to be upgraded, the second controller 50 may copy the second firmware files to the second storage region 12. Therefore, the upgrade of the first firmware file may be implemented simply and quickly, without the need for the user to upgrade the firmware online.

For the existing technology, the firmware needs to be upgraded online, where the printer is connected to the computer via USB, and the printer may be upgraded online through the computer. However, online upgrade may be forced to stop due to network interruption, which requires the user to repeat upgrade operation. In one embodiment of the present disclosure, the upgraded firmware file may be stored in the first storage region 11; and when an upgrade is needed, the upgraded second firmware file may be stored in the second storage region 12 to replace the first firmware file. Through such upgrade manner, upgrade failures caused by various network reasons may be prevented, which is convenient for the user to maintain the printer.

In one embodiment, the image forming apparatus 100 may further include a data selector 70; and the data selector 70 may be connected to the first controller 20, the first interface 30, and the second interface 60, respectively. The data selector 70 may be configured to control the conduction between the first controller 20 and the first interface 30 when the external device accesses the non-transitory memory 10, such that the external device may access the first storage region 11 through the first interface 30. The data selector 70 may further be configured to control the conduction between the first controller 20 and the second interface 60 when the second controller 50 communicates with the non-transitory memory 10, such that the second controller 50 may access the non-transitory memory 10 through the second interface 60.

The data selector 70 may be a multiplex data selector.

The data selector 70 may control the conduction between the first controller 20 and the first interface 30 or control the conduction between the first controller 20 and the second interface 60 according to the objects accessing the non-transitory memory 10. The first controller 20 controls the partition storage of the non-transitory memory 10, such that the external device may only access the first storage region 11, thereby ensuring that the data inside the image forming apparatus is safe and not easily accessible. The data selector 70 may ensure independence of the data transmission between the first controller 20 and the first interface 30 and between the first controller 20 and the second interface 60, and ensure that the external device may only access the first storage region 11.

The non-transitory memory 10, the first interface 30, the second interface 60, the data selector 70, and the first controller 20 may form a detachable part. The detachable part may be pluggably connected to the main body of the image forming apparatus 100.

Figure 2:
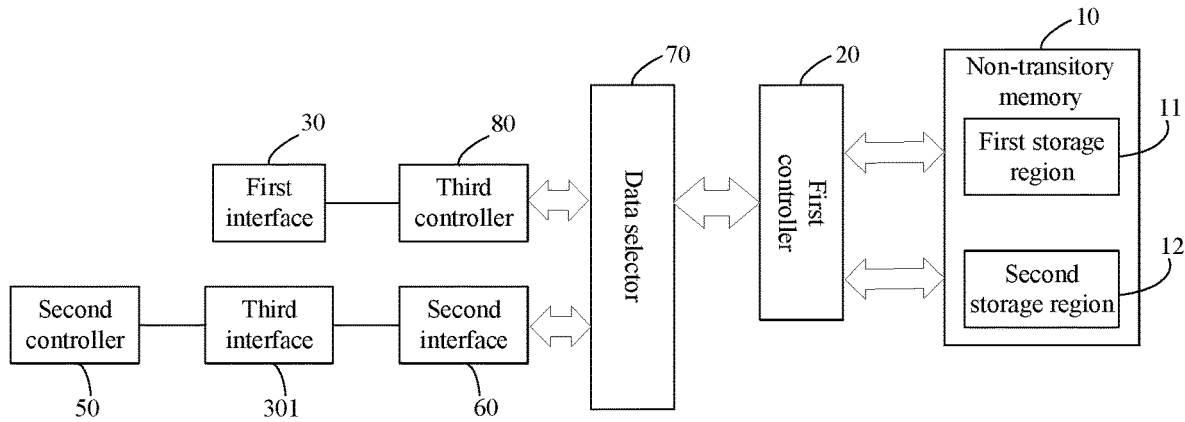
FIG. 2 illustrates another functional block diagram of an image forming apparatus according to various exemplary embodiments of the present disclosure.

Referring to FIG. 2, the non-transitory memory 10, the first interface 30, the second interface 60, the data selector 70, and the first controller 20 may be configured as a detachable part, such that the non-transitory memory 10 may be detachably installed on the main body of the image forming apparatus 100. For example, the non-transitory memory 10 may be detached from a data control board (e.g., a printed circuit board (PCB)) of the image forming apparatus 100. The external device may be a computer.

In one embodiment, the first interface 30 and the second interface 60 of the detachable part may correspond to different physical interfaces, the main body of the image forming apparatus 100 may be configured with a third interface 301, the detachable part may be connected to the third interface 301 of the main body of the image forming apparatus 100 through the second interface 60, and the detachable part may be connected to the external device through the first interface 30.

When the driving programs of the image forming apparatus 100 need to be installed, the detachable part may be detached from the main body of the image forming apparatus 100; the detachable part may be connected to the external device through the first interface 30; the external device may acquire the driving programs of the first storage region 11 and install the driving programs; and after the installation is completed, the detachable part may be reinstalled back into the image forming apparatus 100.

By configuring the detachable part, it is convenient to install the driving programs for multiple external devices. When the driving programs need to be installed in an external device, the user may not need to move the entire image forming apparatus to be connected to the external device and then execute the driving program installation; and the user may only need to remove the detachable part from the main body of the image forming apparatus 100 and connect the detachable part to the external device, the external device may read the driving programs of the first storage region 11 through the first interface, and the driving programs may be installed in the external device, which may be greatly convenient for the installation operation of the user. Especially when installing the driving programs for multiple external devices, the user may only need to connect the detachable part to each external device to quickly and easily complete the installation operation. Similarly, when upgrading the firmware of multiple image forming apparatuses, only the detachable part may need to be removed from the main body and connected to the external device, and the external device may store the second firmware files into multiple detachable parts one by one, which may not require online upgrade. When multiple detachable parts are reinstalled back into the main bodies of their respective image forming apparatuses, automatic upgrade may be implemented, and the user may not need to move the main bodies of the image forming apparatuses to be connected to the external device for maintenance and upgrade.

Figure 3:
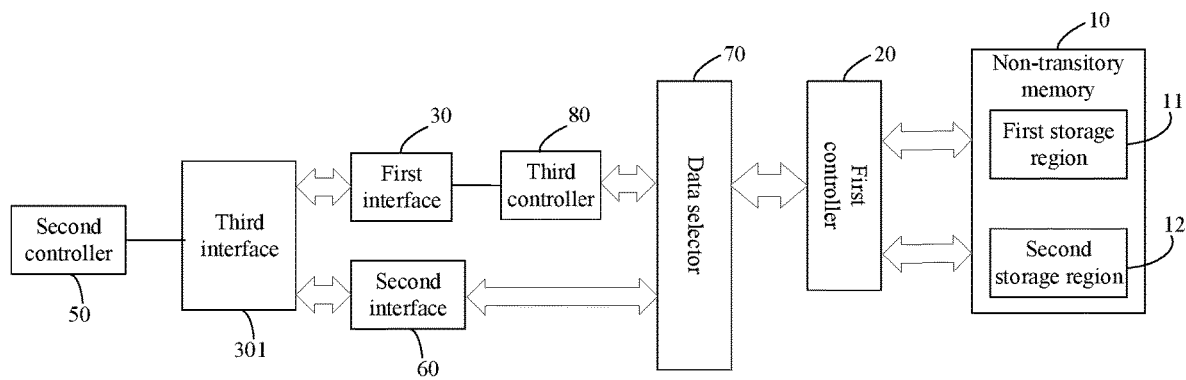
FIG. 3 illustrates another functional block diagram of an image forming apparatus according to various exemplary embodiments of the present disclosure.

Referring to FIG. 3, in one embodiment, the first interface 30 and the second interface 60 of the detachable part may correspond to a same physical interface, and the main body of the image forming apparatus 100 may be configured with the third interface 301. When the same physical interface is connected to the third interface 301, the second controller 50 may communicate with the non-transitory memory 10 in the detachable part through the third interface 301 and the second interface 60. When the same physical interface is connected to the external device, the external device may only access the first storage region 11 of the non-transitory memory 10 through the first interface 30.

In one embodiment, the image forming apparatus 100 may further include a third controller 80, and the first interface 30 may be a USB interface. The third controller 80 may be connected between the first controller 20 and the USB interface, configured to control the communication between the external device and the first controller 20 to read and write the first storage region 11. For example, the third controller 80 may also be referred to as a USB controller, and the third controller 80 may establish the USB communication between the external device and the first controller 20, which enables the external device to read and write the first storage region 11 of the image forming apparatus 100. Using the USB interface may increase the compatibility of the first interface 30.

The second interface 60 may be a plug, and the third interface 301 may be a corresponding socket; or the second interface 60 may be a socket, and the third interface 301 may be a corresponding plug. The second interface 60 may be, for example, a general purpose input/output (GPIO) interface or a serial peripheral interface (SPI).

The non-transitory memory 10 may also be non-detachably installed on the main body of the image forming apparatus 100, thereby ensuring information security and preventing the non-transitory memory 10 from being lost. When the driving programs of the image forming apparatus 100 need to be installed, the computer may communicate with the non-transitory memory 10 through the first interface 30, and the computer may acquire the driving programs of the first storage region 11 and perform the driving program installation.

In addition, when the second controller 50 communicates with the non-transitory memory 10 through the third interface 301 and the second interface 60, the second controller 50 may access entire address space of the non-transitory memory 10 through the first controller 20.

Figure 4:
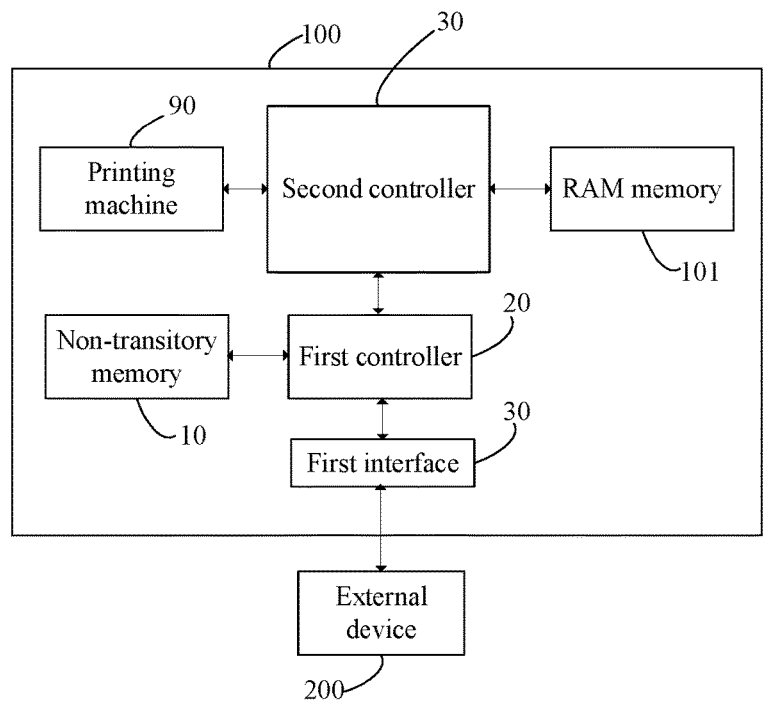
FIG. 4 illustrates another functional block diagram of an image forming apparatus according to various exemplary embodiments of the present disclosure.

Referring to FIG. 4, in one embodiment, the image forming apparatus 100 may further include a printing machine 90 which may be connected to the second controller 50. The printing machine 90 may include an image forming part, a driving circuit, and a medium conveying mechanism. The second controller 50 may control the printing of the image forming part on a medium through the driving circuit; and the medium may also be conveyed by the medium conveying mechanism. The image forming part may be a laser, and the laser may implement the printing on the medium through exposure.

In one embodiment, the image forming apparatus 100 may further include a RAM memory 101. The RAM memory 101 may be configured to temporarily store printing data and status data of the image forming apparatus 100. The printing data may be the data transmitted by an external device 200 to the image forming apparatus 100, or may be the data generated internally by the image forming apparatus 100, for example, generated by the scanning of the image forming apparatus 100. The status data of the image forming apparatus 100 may be the remaining amount status of consumables, the working status of the image forming apparatus 100, and the like. The RAM memory 101 may be connected to the second controller 50, and the second controller 50 may store the printing data and status data of the image forming apparatus 100, which need to be temporarily stored, in the RAM memory 101. When the RAM memory 101 is configured to store the printing data transmitted by the external device 200, the second controller 50 may receive the printing data transmitted by the external device 200 through interfaces (e.g., a network interface, a WiFi interface, a USB interface, and the like) other than the first interface 30 and the second interface 60.

Various embodiments of the present disclosure also provide a control system of the image forming apparatus. The control system of the image forming apparatus may include the above-mentioned image forming apparatus 100 and the external device 200. The external device 200 may communicate with the first interface 30; and the external device 200 may acquire and install the driving programs of the first storage region 11 through the first interface 30. The external device 200 may be a device including a computer, a mobile phone, a mobile computer, or a tablet computer.

Figure 5:
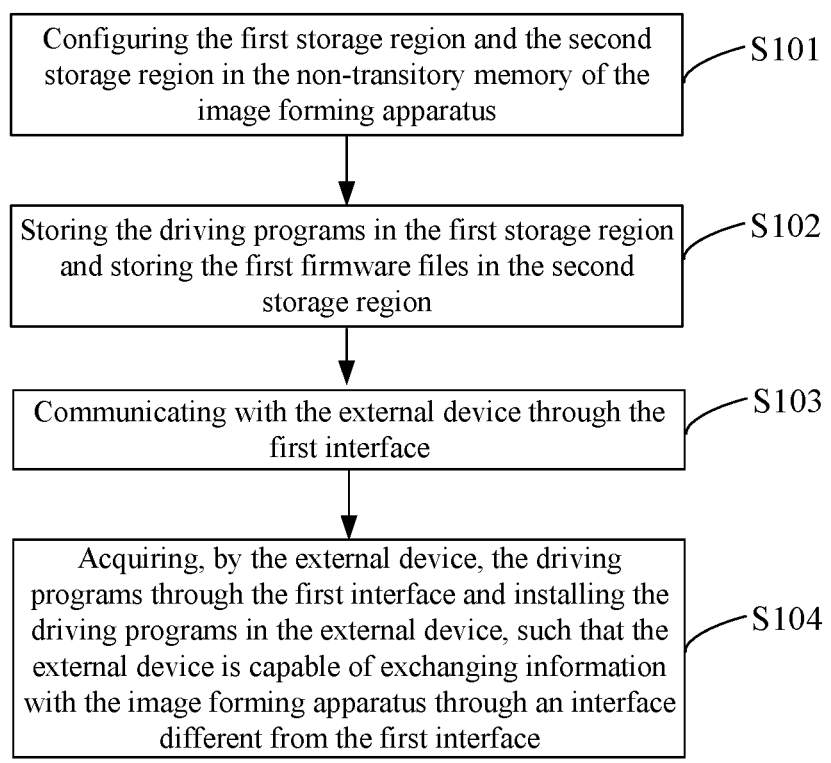
FIG. 5 illustrates a flowchart of a control method of an image forming apparatus according to various exemplary embodiments of the present disclosure.

Referring to FIG. 5, various embodiments of the present disclosure also provide a control method of the image forming apparatus. The method may be applied to the image forming apparatus according to any one of the above-mentioned embodiments. The method may include:

S101, configuring the first storage region and the second storage region in the non-transitory memory of the image forming apparatus;

S102, storing the driving programs in the first storage region and storing the first firmware files in the second storage region;

S103, communicating with the external device through the first interface; and

S104, acquiring, by the external device, the driving programs through the first interface and installing the driving programs in the external device, such that the external device may be capable of exchanging information with the image forming apparatus through an interface different from the first interface.

For the control method of various embodiments of the present disclosure, the non-transitory memory may be configured with the first storage region and the second storage region, the first storage region may be configured to store the driving programs, the second storage region may be configured to store the first firmware files, and the external device may acquire the driving programs in the first storage region for installation. Therefore, it may avoid that the driving programs of the image forming apparatus cannot be installed due to the lack of the optical drive, and the optical disk attached for the installation of the driving programs in the existing technology may be omitted, which may achieve the effect of saving design costs.

Figure 6:
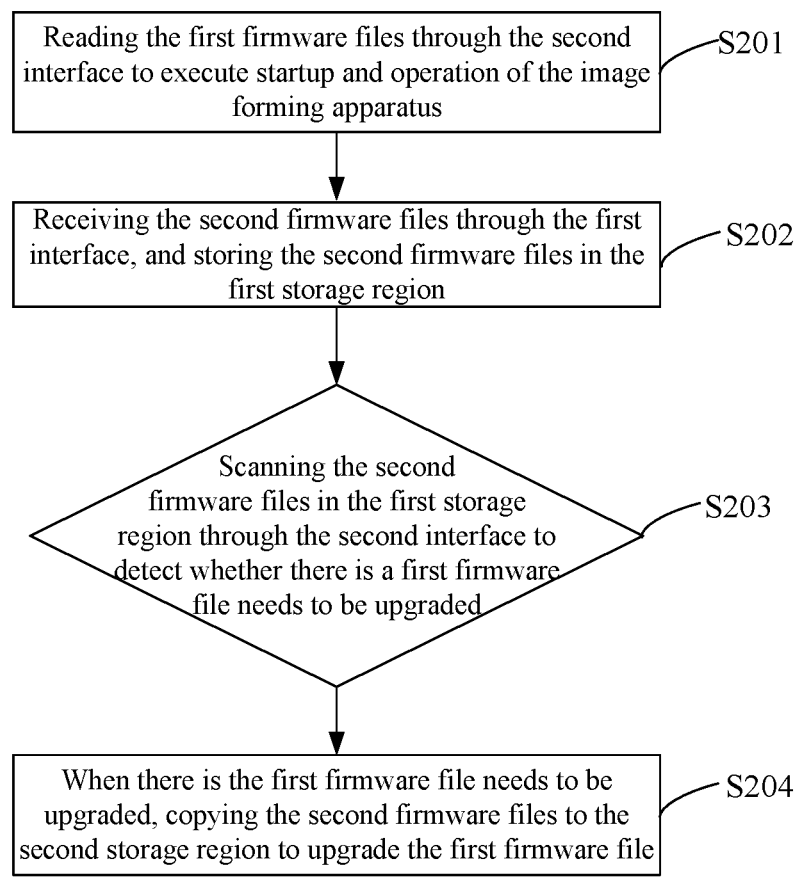
FIG. 6 illustrates a flowchart of another control method of an image forming apparatus according to various exemplary embodiments of the present disclosure.

Refer to FIG. 6, in one embodiment, the control method may further include the following steps.

In S201, the first firmware files may be read through the second interface to execute the startup and operation of the image forming apparatus. That is, the image forming apparatus may start normally using the existing firmware files.

In S202, the second firmware files may be received through the first interface and stored in the first storage region.

In S203, the second firmware files in the first storage region may be scanned through the second interface to detect whether there is a first firmware file needs to be upgraded.

The second firmware files may be upgrade files corresponding to the first firmware files. The first storage region may store a plurality of second firmware files.

During the startup process, the second controller may detect whether there is a first firmware file needs to be upgraded by checking the file headers of the second firmware files in the first storage region one by one. When there is no first firmware file needs to be upgraded, the scanning of the second firmware files in the first storage region may be terminated, and the image forming apparatus may start normally.

In S204, when there is the first firmware file needs to be upgraded, the second firmware files may be copied to the second storage region to upgrade the first firmware file.

For example, when there is the first firmware file needs to be upgraded, the second firmware file corresponding to the first firmware file may be marked with an flag for execution, and the corresponding second firmware file may be configured for starting the image forming apparatus; next, it may determine whether the corresponding second firmware file successfully starts the image forming apparatus; if the corresponding second firmware file successfully starts the image forming apparatus, the corresponding second firmware file may be written into the second storage region, and the second firmware file in the second storage region may be marked to start the image forming apparatus; next, the second firmware file in the second storage region may be configured for restarting the image forming apparatus, thereby implementing the upgrade of the first firmware file; and the second firmware file corresponding to the first storage region may be finally deleted. If it is determined that the corresponding second firmware file fails to start the image forming apparatus, a watchdog may mark a flag for starting the image forming apparatus using the first firmware file in the second storage region, and then the first firmware file in the second storage region may be configured for restarting the image forming apparatus.

Before the first firmware file is upgraded described above, starting the image forming apparatus by the second firmware file may be verified, thereby avoiding that the second firmware file fails to upgrade the first firmware file.

The manner for configuring the partitions of the non-transitory memory may be that: the external device may only read and write the data in the first storage region of the non-transitory memory through the first interface; and the data in the first storage region and the second storage region in the non-transitory memory may be read and written through the second interface. In such way, it ensures that the external device may only access the first storage region, thereby preventing data in other storage regions of the image forming apparatus from being read and written arbitrarily by the external device.

In one embodiment, by storing the second firmware files in the first storage region and loading the first firmware files, the second firmware files in the first storage region may be scanned to detect whether there is a first firmware file needs to be upgraded; and when there is the first firmware file needs to be upgraded, the second firmware files may be copied to the second storage region. Therefore, it may solve the problem that existing online upgrade is easily interrupted due to power failure or network interruption, which may result in upgrade failure and repeat operations.

The image forming apparatus provided by embodiments of the present disclosure may be more convenient for the user to operate when configuring the connection network of the image forming apparatus. In the existing technology, for the network configuration operation of the image forming apparatus, the user may need to connect the image forming apparatus with a network terminal (e.g., a PC or mobile phone); after installing a corresponding configuration application through the network terminal, the user may need to enter an SSID and a password; next, the SSID and password may be transmitted to the image forming apparatus through the connection path between the network terminal and the image forming apparatus. In the network configuration operation, the user needs to connect the image forming apparatus with the network terminal through various wired or wireless manners and the operation steps are cumbersome and time consuming. In contrast, the solutions provided by embodiments of the present disclosure provide that the external device 200 may store the configuration information (one of the SSID and password) required to configure the connection network of the image forming apparatus through the first interface 30, in the first storage region 11 of the non-transitory memory 10 of the image forming apparatus; and the second controller 50 may read and analyze the configuration information of the first storage region 11 through the second interface 60, thereby connecting the image forming apparatus to the network.

In an exemplary specific operation, when there is a need to operate the network configuration of the image forming apparatus 100, the detachable part may be detached from the main body of the image forming apparatus 100, and the detachable part may be connected to the external device 200 through the first interface 30; after the user specifies the SSID of the router to be connected on the external device 200 and enters the corresponding password, the external device 200 may acquire the SSID and password, and store the SSID and password in the first storage region 11 of the image forming apparatus 100 through the first interface 30; next, the detachable part may be installed back into the image forming apparatus 100; and the image forming apparatus 100 may execute network parameter configuration according to the SSID and password of the first storage region 11 to establish network communication with the router. A specific file path may be configured in the first storage region 11 to save the configuration information, and the external device 200 may store the configuration information in the specific file path of the first storage region 11. When the detachable part is connected to the image forming apparatus 100, the second controller 50 of the image forming apparatus 100 may access the specific file path through the second interface 60; the configuration information may be copied to the second storage region 12 for network configuration operations; and when the network configuration is successfully configured, the network configuration information in the first storage region 11 may be deleted. In embodiments of the present disclosure, the configuration information may be stored in the detachable part, which can facilitate the user to store needed network connection configuration information into the image forming apparatus, such that the image forming apparatus may be quickly connected to the network. Through the modifications disclosed in embodiments of the present disclosure, it may not only play the role of quick and convenient installation for the driving program installation of the image forming apparatus, but also improve the user's quick setting on configuring the network of the image forming apparatus; and the user does not need to connect the entire image forming apparatus to an external device in a wired or wireless manner in advance.

The technical features of the above-mentioned embodiments may be combined arbitrarily. In order to make the description concise, all possible combinations of various technical features in the above-mentioned embodiments may not be described. However, as long as there is no contradiction in the combination of these technical features, it should be regarded as the scope of the present specification.

The above-mentioned embodiments may only express some implementation manners of the present disclosure with relatively specific and detailed descriptions. However, it may not be interpreted as a limitation on the scope of the present disclosure. It should be noted that for those skilled in the art, without departing from the concept of the present disclosure, some modifications and improvements may be made, and these modifications and improvements may all fall within the protection scope of the present disclosure. Therefore, the scope of protection of the present disclosure shall be subject to the appended claims.

What is claimed is:

1. An image forming apparatus, comprising: a main body; and a detachable part detachably connected to the main body, the detachable part comprising a non-transitory memory and a processor connected to the non-transitory memory to execute:
controlling read and write of the non-transitory memory, wherein a first storage region and a second storage region are configured in the non-transitory memory, the first storage region is configured to store driving programs, and the second storage region is configured to store first firmware files;
processing, without an online network connection, access by an external device to the non-transitory memory;
processing conduction to allow the external device access to the driving programs stored in the first storage region of the non-transitory memory through a first interface; and
processing conduction between a first controller and a second interface to allow access to the non-transitory memory through the second interface, wherein the first controller, the first interface, and the second interface are structural components of the detachable part.

2. The image forming apparatus according to claim 1, wherein the processor is further configured to execute:
reading the first firmware files in the second storage region through the second interface to execute startup and operation of the image forming apparatus.

3. The image forming apparatus according to claim 2, wherein the processor is further configured to execute:
receiving second firmware files through the first interface, and storing the second firmware files in the first storage region.

4. The image forming apparatus according to claim 1, wherein the processor is further configured to execute:
controlling conduction between the first controller and the first interface when the external device accesses the non-transitory memory, such that the external device accesses the first storage region through the first interface.

5. The image forming apparatus according to claim 1, wherein:
the main body of the image forming apparatus is configured with a third interface;
the detachable part is connected to the third interface of the main body of the image forming apparatus through the second interface; and
the detachable part is connected to the external device through the first interface.

6. The image forming apparatus according to claim 1, wherein:
the main body of the image forming apparatus is configured with a third interface.

7. The image forming apparatus according to claim 1, wherein the processor is further configured to execute:
controlling conduction between the first controller and the second interface to allow access to the non-transitory memory through the second interface.

8. The image forming apparatus according to claim 1, wherein the processor is further configured to execute:
storing a second firmware file in the storage region;
detecting one of the first firmware files stored in the second storage region is to be upgraded; and
copying the second firmware file to the second storage region to upgrade the one of the first firmware files.

9. The image forming apparatus according to claim 1, wherein the processor is further configured to execute:
detaching the detachable part from the main part; and
connecting the detached detachable part to the external device.

10. The image forming apparatus according to claim 1, wherein the external device is a first external device, and the processor is further configured to execute:
detaching the detachable part from the first external device; and
connecting the detached detachable part to a second external device different than the first external device.

11. The image forming apparatus according to claim 1, wherein the processor is further configured to execute:

allowing access by the external device to only read and write the first storage region to avoid data in the second storage region from being modified by the external device.

12. A control system, comprising: an image forming apparatus and an external device, wherein the image forming apparatus comprises: a main body; and a detachable part detachably connected to the main body, the detachable part comprising a non-transitory memory and a processor connected to the non-transitory memory to execute:
controlling read and write of the non-transitory memory, wherein a first storage region and a second storage region are configured in the non-transitory memory, the first storage region is configured to store driving programs, and the second storage region is configured to store first firmware files;
processing, without an online network connection, access by an external device to the non-transitory memory;
processing conduction to allow the external device access to the driving programs stored in the first storage region of the non-transitory memory through a first interface; and
processing conduction between a first controller and a second interface to allow access to the non-transitory memory through the second interface, wherein the first controller, the first interface, and the second interface are structural components of the detachable part.

13. The control system according to claim 12, wherein the processor is further configured to execute:
reading the first firmware files in the second storage region through the second interface to execute startup and operation of the image forming apparatus.

14. The control system according to claim 12, wherein the processor is further configured to execute:
controlling conduction between the first controller and the first interface when the external device accesses the non-transitory memory, such that the external device accesses the first storage region through the first interface.

15. The control system according to claim 12, wherein:
the main body of the image forming apparatus is configured with a third interface;
the detachable part is connected to the third interface of the main body of the image forming apparatus through the second interface; and
the detachable part is connected to the external device through the first interface.

16. The control system according to claim 12, wherein the main body of the image forming apparatus is configured with a third interface.

17. The control system according to claim 12, wherein the processor is further configured to execute:
receiving second firmware files through the first interface, and storing the second firmware files in the first storage region.

18. The control system according to claim 12, wherein the processor is further configured to execute:
controlling conduction between the first controller and the second interface to allow access to the non-transitory memory through the second interface.

19. A control method of an image forming apparatus, the apparatus including: a main body; and a detachable part detachably connected to the main body, the detachable part including a non-transitory memory and a processor connected to the non-transitory memory, the method comprising:
controlling read and write of the non-transitory memory, wherein a first storage region and a second storage region are configured in the non-transitory memory, the first storage region is configured to store driving programs, and the second storage region is configured to store first firmware files;
processing, without an online network connection, access by an external device to the non-transitory memory;
processing conduction to allow the external device access to the driving programs stored in the first storage region of the non-transitory memory through a first interface; and
processing conduction between a first controller and a second interface to allow access to the non-transitory memory through the second interface, wherein the first controller, the first interface, and the second interface are structural components of the detachable part.

20. The control method according to claim 19, further comprising:
communicating with the external device through the first interface to obtain configuration information of a network; and
reading the configuration information through the second interface to execute the image forming apparatus to connect to the network.

* * * * *